(12) United States Patent
Li et al.

(10) Patent No.: US 10,260,345 B2
(45) Date of Patent: Apr. 16, 2019

(54) SHIELD-CARRIED NONCONTACT FREQUENCY-DOMAIN ELECTRICAL REAL-TIME ADVANCED DETECTION SYSTEM AND METHOD

(71) Applicant: SHANDONG UNIVERSITY, JiNan, ShanDong Province (CN)

(72) Inventors: Shucai Li, JiNan (CN); Lichao Nie, JiNan (CN); Bin Liu, JiNan (CN); Haidong Liu, JiNan (CN); Yuxiao Ren, JiNan (CN); Jie Song, JiNan (CN); Zhengyu Liu, JiNan (CN); Qian Guo, JiNan (CN); Chuanwu Wang, JiNan (CN)

(73) Assignee: SHANDONG UNIVERSITY, Jinan (CN)

( * ) Notice: Subject to any disclaimer, the term of this patent is extended or adjusted under 35 U.S.C. 154(b) by 168 days.

(21) Appl. No.: 15/323,284

(22) PCT Filed: Apr. 21, 2016

(86) PCT No.: PCT/CN2016/079826
§ 371 (c)(1),
(2) Date: Dec. 30, 2016

(87) PCT Pub. No.: WO2017/166342
PCT Pub. Date: Oct. 5, 2017

(65) Prior Publication Data
US 2017/0306757 A1    Oct. 26, 2017

(30) Foreign Application Priority Data

Mar. 31, 2016  (CN) .......................... 2016 1 0202312

(51) Int. Cl.
*E21D 9/00*    (2006.01)
*E21D 9/06*    (2006.01)
(Continued)

(52) U.S. Cl.
CPC ............. *E21D 9/003* (2013.01); *E21D 9/004* (2013.01); *E21D 9/0621* (2013.01);
(Continued)

(58) Field of Classification Search
CPC ....... E21D 9/003; E21D 9/004; E21D 9/0621; E21D 9/0692; G01V 3/08; G01V 3/26; G08C 15/10; G08C 23/04
See application file for complete search history.

(56) References Cited

U.S. PATENT DOCUMENTS

| 8,322,462 B2* | 12/2012 | Kuckes | E21B 47/02216 175/41 |
| 2007/0236222 A1* | 10/2007 | Gorek | G01V 3/22 324/356 |

(Continued)

FOREIGN PATENT DOCUMENTS

| CN | 105068128 A | 11/2015 |
| CN | 105096563 A | 11/2015 |
| WO | 98/18025 A1 | 4/1998 |

OTHER PUBLICATIONS

Jan. 9, 2017 International Search Report issued in International Patent Application No. PCT/CN2016/079826.

(Continued)

*Primary Examiner* — Yong-Suk Ro
(74) *Attorney, Agent, or Firm* — Oliff PLC

(57) ABSTRACT

A shield-carried noncontact frequency-domain electrical real-time advanced detection system and method are provided. Noncontact electrodes are installed on a cutter head of a shield tunneling machine, current is emitted and received using capacitance coupling, the electrodes are connected to a host via a multi-way swivel joint, measured data is inversed and interpreted in real time, and the prediction result is transmitted to a control system of the shield tunneling machine so as to provide a technical support for safety construction of the shield tunneling machine; the noncontact electrodes are installed on the shield cutter head. Real-time advanced detection of geology in front of a tunnel face can be realized in the tunneling process, so that the requirement for quick tunneling construction is met, and the efficiency of advanced geological detection of the shield tunneling machine is improved; and an electrode system is only installed on the cutter head.

17 Claims, 7 Drawing Sheets

(51) Int. Cl.
*G01V 3/26* (2006.01)
*G01V 3/08* (2006.01)
G08C 15/10 (2006.01)
G08C 23/04 (2006.01)

(52) U.S. Cl.
CPC ............ *E21D 9/0692* (2013.01); *G01V 3/08* (2013.01); *G01V 3/26* (2013.01); *G08C 15/10* (2013.01); *G08C 23/04* (2013.01)

(56) References Cited

U.S. PATENT DOCUMENTS

| | | | | |
|---|---|---|---|---|
| 2008/0245568 | A1* | 10/2008 | Jeffryes | E21B 7/06 175/16 |
| 2009/0050371 | A1* | 2/2009 | Moeny | E21B 10/00 175/57 |
| 2013/0088364 | A1* | 4/2013 | Bittar | E21B 47/01 340/856.3 |
| 2014/0333308 | A1* | 11/2014 | Li | E21D 9/003 324/324 |
| 2015/0077119 | A1* | 3/2015 | Li | G01V 3/04 324/324 |
| 2015/0233242 | A1* | 8/2015 | Li | G01S 13/885 342/22 |

OTHER PUBLICATIONS

Jan. 9, 2017 Written Opinion issued in International Patent Application No. PCT/CN2016/079826.

* cited by examiner

SHIELD-CARRIED NONCONTACT FREQUENCY-DOMAIN ELECTRICAL REAL-TIME ADVANCED DETECTION SYSTEM AND METHOD

FIELD OF THE INVENTION

The present invention relates to a shield-carried noncontact frequency-domain electrical real-time advanced detection system and method.

BACKGROUND OF THE INVENTION

At present, more than 40 counties in the world have opened urban subway lines, and developed counties own highly developed urban subway facilities. Subways have borne a main passenger transportation task in traffic of many cities, and the lives of residents in such cities as Moscow, New York, Beijing and the like is inseparable from the subways. Due to the advantages and convenience of rail transit, more and more countries and cities begin to develop their rail transit. With the rapid development of worldwide rail transit, more and more tunnels will be built in each country in the field of rail transit. Compared with traditional tunnel construction methods such as an open cut method, shallow-buried tunneling method and the like, the shield construction method has the advantages of "high tunneling speed, high production efficiency, civilized construction environment, good technical and economic superiorities" and the like, so increasing international subway tunnels are built by adopting the shield construction method at present, wherein the earth pressure balance shield is a common shield form in the shield construction.

The earth pressure balance shield construction belongs to full-section tunnel boring machine construction and is mainly used for urban underground soft soil ground layer construction, and the bad geological condition is more complex due to shallow burying and abrupt changes of geological units. Meanwhile, since urban ground buildings are dense, it is difficult to comprehensively find out the bad geological condition along the subway line by ground investigation. Once bad geological bodies such as water rich quick sand layers, water-containing corrosion cavities, boulders and the like are encountered in the excavation process, and engineering accidents such as collapse, water outburst, ground surface settlement and the like often happen, situations are caused ranging from damage of shied machinery and construction period delay to stratum collapse resulting in major safety accidents. Construction disasters can be effectively avoided by detecting the information such as the position and the scale of a bad geological body and the like in advance. Accordingly, it is very necessary to carry an advanced prediction system and develop whole-course real-time advanced detection in the earth pressure balance shield. However, the whole space of a shield construction tunnel is occupied by a huge shield tunneling machine, no detection space is available for geophysical detection, meanwhile, the construction vibration of shield machinery, huge metal bodies, supporting mechanical and electrical equipment and the like seriously interfere with geophysical fields such as an electric field, a wave field and the like, as a result, common geophysical prospecting methods such as a seismic wave method, an electromagnetic method and the like for a drilling and blasting method are inapplicable. The frequency-domain electrical method is sensitive to water in response, and the focusing electrical method has the characteristic of shielding rear interference and is advantageous in the complex environment of the shield construction tunnel. The BEAM (Bore-Tunneling Electrical Ahead Monitoring) method is a tunnel boring machine advanced detection technology developed by Germany and realizes real-time detection using a shield and a cutter as a power supply electrode and a measuring electrode, but the cutter selected as an electrode on a cutter head is in contact conduction with a tunnel face, resulting in high ground resistance. Meanwhile, positioning of BEAM excessively depends on experience, so that the positioning precision is low and three-dimensional imaging cannot be realized.

Thus, carrying an electrical prospecting device on the shield tunneling machine still faces many problems, and the main problems are as follows:

(1) An earth pressure balance shield cutter head closely clings to the earth of the tunnel face all the time and cannot be retracted in order to keep the earth pressure balance of the tunnel face in the construction environment of the shield tunneling machine, so no detection space is available in front of the cutter head, and an observation mode or method available in front of the shield cutter head is the first problem to be solved.

(2) Common electrical detection adopts contact electrodes in contact coupling with the tunnel face. The electrodes and the propulsion device exposed in front of the cutter head are easily influenced by the tunneling construction and easily damaged, and it is difficult for the contact electrodes to work under the rotation of the cutter head, so how to adopt the noncontact electrodes to realize real-time advanced detection in the rotating mode of the cutter head is an important problem. In addition, the problem about a rotary junction device and an electrode positioning device also needs to be solved in order to realize real-time detection of the shield.

(3) Since noncontact electrodes are adopted, current emission and reception instruments required for frequency-domain electrical detection also need to be developed, meanwhile, in order to meet the requirement for quick construction of the shield, how to realize real-time automatic detection of a detection system is a further problem, and a system for controlling current emission, signal acquisition, electrode positioning and quick interpretation is needed.

SUMMARY OF THE INVENTION

In order to solve the above problems, the present invention provides a shield-carried noncontact frequency-domain electrical real-time advanced detection system and method. In the present invention, noncontact electrodes are installed on a cutter head of a shield tunneling machine, current is emitted and received by capacitance coupling, the noncontact electrodes are connected to a host via a multi-way swivel joint, measured data is inversed and interpreted in real time, and the prediction result is transmitted to a control system of the shield tunneling machine, thereby providing a technical support for safety construction of the shield tunneling machine.

In order to fulfill the above purposes, the present invention adopts the following technical solution:

A shield-carried noncontact frequency-domain electrical real-time advanced detection system includes a noncontact electrode unit, a multi-way swivel joint, an electrode positioning unit, a power supply and measurement unit and a control unit; the noncontact electrode unit includes a plurality of noncontact electrodes arranged on a front panel of a cutter head and is used for array-type multi-way information acquisition, the electrode positioning unit is arranged in the middle of a rear panel of the cutter head and used for determining the rotating positions of the noncontact electrodes for real-time positioning;

the multi-way swivel joint is arranged behind the cutter head, a connection cable for each noncontact electrode is converged to a multi-core cable, the power supply and measurement unit outputs multi-way frequency-domain current and acquires signals, and the control unit is connected with the power supply and measurement unit and used for acquiring data of the noncontact electrodes and positions of the electrodes on the cutter head according to different set frequency domains and then performing three-dimensional inversion and interpretation.

Further, the power supply and measurement unit is further connected with fixed electrodes, and is used for emitting multi-frequency current and acquiring measured signals under the control of the control unit and acquiring potential differences between the noncontact electrodes and the fixed electrodes.

The fixed electrodes are arranged behind the shield tunneling machine, regarded at infinite positions.

Further, the noncontact electrodes are uniformly arranged on the front panel of the cutter head of the shield tunneling machine.

Preferably, the noncontact electrodes include noncontact power supply electrodes and noncontact measuring electrodes, the noncontact power supply electrodes are arranged on the outer side of the cutter head and connected with the power supply and measurement unit to output multi-way frequency-domain current, and the noncontact measuring electrodes are arranged on the inner side the power supply electrodes to realize arrayed measuring electrode acquisition.

Preferably, each noncontact electrode includes an electrode plate, the surface of the electrode plate is wrapped by a metal oxide film, the electrode plate is located in a frame housing formed by an insulating wear resistant material, a cable fixing column is arranged on the back of the electrode plate, and a rubber plug is arranged on the circumference of the cable fixing column.

The electrode plate is a circular metal copper plate, and the metal oxide film prevents the performance from being influenced by corrosion due to long-time work after the electrode is installed. Meanwhile, the noncontact electrode is embedded and fixed onto the surface of the cutter head by the insulating wear resistant material, but the metal copper plate does not directly contact the cutter head, a connection cable is fixed on the back of the metal copper plate via the cable fixing column, the circumference of the fixing column is buffered and fixed by adopting the compact rubber plug, and the compact rubber plug simultaneously isolates the metal copper plate from the cutter head.

Preferably, the electrode positioning unit is a rotary coder including a grating type euphotic coded disc and a photoelectric processing circuit, and the photoelectric processing circuit records the rotating displacement of the cutter head via angular displacement and angular speed of the grating type euphotic coded disc, so that the positions of the noncontact electrodes are determined and then the noncontact electrodes on the cutter head are positioned.

The electrode positioning unit is arranged in the middle of the cutter head, and a hollow structure or a hole through which the connection cables of the noncontact electrodes penetrate is formed in the center of the electrode positioning unit.

Specifically, a rotating shaft is arranged in the center of the grating type euphotic coded disc, euphotic gratings are uniformly distributed at the edge of the grating type euphotic coded disc, a light emitting device is arranged on one side of the grating type euphotic coded disc, the light emitting device and the noncontact electrodes rotate with the cutter head of the shield tunneling machine, and secondary gratings and a photosensitive device are arranged on the other side of the grating type euphotic coded disc; and light emitted by the light emitting device penetrates through the gratings of the grating type euphotic coded disc and the secondary gratings and is received by the photosensitive device.

Preferably, the light emitting device is arranged on the back of the cutter head, and rotates along with the cutter head, and the photoelectric processing circuit and the secondary gratings are not arranged on the cutter head and do not rotate.

Preferably, the rotating shaft has a hollow structure in which the connection cables of all the noncontact electrodes are placed.

Preferably, the connection cables are single-core cables.

Further, the multi-core cable includes multiple metal leads, each metal lead is wrapped by an insulating layer, all the metal leads are wrapped by a braided layer, and the braided layer is wrapped by a jacket.

Preferably, the metal leads are copper wires.

Because the laying distance of the multi-core cable inside the shield is long and the project environment of installation and fixation is also very complex, the multi-core cable jacket, the braided layer and the insulating layer well protect the cable from being easily worn in the cutter head, and relieve the interference of the shield tunneling machine to the alternating current in the copper wires to a certain degree. Preferably, the multi-way swivel joint includes a rotor and a stator, wherein the rotor is movably connected to the stator, a plurality of passages are distributed on the rotor along the central circumference, the connection cables of the noncontact electrodes are arranged in the passages, a cable passage for bearing the multi-core cable is formed in the center of the stator, and the connection cables respectively correspond to the metal leads of the multi-core cable one by one inside the stator via slip rings. Preferably, the power supply and measurement unit includes a multi-frequency power supply output module, a multi-way acquisition and reception module and a control module, wherein the control module controls the operations of the multi-frequency power supply output module and the multi-way acquisition and reception module and is connected with a display module.

The multi-frequency power supply output module includes a sinusoidal oscillator and a singlechip, the singlechip controls the sinusoidal oscillator to output alternating current of corresponding waveforms, then electrical energy is provided to the power supply electrodes, and multi-frequency current is thus output.

Preferably, the sinusoidal oscillator is connected with a circuit amplifier.

Preferably, the control module is further connected with a voltage and current measuring module, an overvoltage and overcurrent protection module and a data acquisition module.

Preferably, the multi-way acquisition and reception module specifically includes a data sampling module, an input protection module, wave traps, a rectifier filter and an A/D converter, wherein the input protection module is connected with the measuring electrodes of the fixed electrodes and the noncontact electrodes, the potential of each measuring electrode is measured via the data sampling module, the wave traps, the rectifier filter and the A/D converter in sequence, and the potential differences between the measuring electrodes of the noncontact electrodes and the fixed electrodes are obtained; and the A/D converter is connected with the control module. The control unit includes a control host and an inversion module, the control host is connected with the control module and the multi-way acquisition and reception module, receives the potential differences between the measuring electrodes of the noncontact electrodes and the fixed electrodes and simultaneously receives position information of the cutter head transmitted by the electrode positioning unit, and the control host sets the acquisition frequency domain; and the inversion module inverses the acquired data.

A shield tunneling machine includes the aforementioned noncontact frequency-domain electrical real-time advanced detection system, the noncontact electrodes are installed on the working face of the cutter head of the shield tunneling machine and rotate along with the cutter head, and the fixed electrodes are fixedly arranged at the tail of the shield tunneling machine.

A noncontact electrical real-time advanced detection method for a shield construction tunnel includes the following steps:

(1) arranging a plurality of noncontact measuring electrodes and noncontact power supply electrodes on the surface of a cutter head of a shield tunneling machine, and arranging a power supply electrode and a measuring electrode of fixed electrodes behind the shield tunneling machine;

(2) setting an electrode positioning device to determine the position of the cutter head and the spatial positions of the noncontact measuring electrodes, and setting alternating current with fixed frequency by using a control host to supply power to each power supply electrode;

(3) acquiring the potentials of the noncontact measuring electrodes and the measuring electrode of the fixed electrodes at the set frequency domain, calculating the potential difference between the both, simultaneously determining spatial position information of each noncontact electrode, thereby accomplishing correspondence between measured data and position data;

(4) changing the set frequency domain, and repeating step (3) to obtain potentials and position data under different frequencies;

(5) sequentially selecting different working faces for detection along with the propulsion of the cutter head of the shield tunneling machine on the tunnel face, repeating step (3) and step (4), thereby realizing real-time acquisition of detected data; and (6) iterating the acquired data, inversing potential difference data measured by the array-type noncontact measuring electrode system to obtain three-dimensional resistance image distribution in front of the working face, and then interpreting the geological condition in front of the tunnel face.

Further, in step (1), the specific method is as follows: noncontact power supply electrodes and noncontact measuring electrodes are installed on the cutter head in the manufacturing process of the shield tunneling machine, the noncontact power supply electrodes and the noncontact measuring electrodes are respectively annularly distributed on the working face of the cutter head, a ring constituted by the noncontact power supply electrodes is sleeved outside a ring constituted by the noncontact measuring electrodes, the polarities of the plurality of noncontact power supply electrodes are the same, and the plurality of noncontact measuring electrodes constitute the array-type noncontact measuring electrode system; meanwhile, the fixed power supply electrode and the fixed measuring electrode are fixedly installed at the tail of the shield tunneling machine.

Preferably, step (2) specifically includes: an electrode positioning device is installed on the central line of the cutter head, the rotating portion of the electrode positioning device is arranged on the back of the cutter head, the static portion is arranged behind the cutter head, a swivel joint is installed behind the cutter head, a multi-core cable and single-core cables are laid, one end of each single-core cable is connected to a noncontact electrode on the cutter head, and the other end of each single-core cable penetrates through the hollow portion of the electrode positioning device and is connected to the swivel joint.

In step (2), the multi-core cable is connected between the swivel joint and a power supply and measurement device, meanwhile, the fixed power supply electrode and the fixed measuring electrode are respectively connected to the power supply and measurement device by the single-core cables, a host system is connected with the electrode positioning device and the power supply and measurement device, and the connection of a noncontact frequency-domain electrical real-time advanced detection system is thus accomplished.

Step (3) is specifically as follows: alternating current is supplied to surrounding rock of a tunnel face via the capacitance coupling effect of the noncontact power supply electrodes, the surrounding rock generates electric potential so that the noncontact measuring electrodes in the array-type noncontact measuring electrode system generate current, the potential difference between each noncontact measuring electrode and the fixed measuring electrode is obtained, meanwhile, the electrode positioning device transmits spatial position information of each noncontact electrode to the control host, and correspondence between measured data and position data is thus accomplished.

The present invention has the following advantages:

(1) according to a noncontact electrical real-time advanced detection system put forward by the present invention for a shield tunneling machine, noncontact electrodes are installed on the shield cutter head, thereby solving the problem that the traditional contact electrodes are difficult to couple; on the premise that the shield tunneling machine does not need to shut down, real-time advanced detection of geology in front of a tunnel face can be realized in the tunneling process, the requirement for quick tunneling construction is met, and the efficiency of advanced geological detection of the shield tunneling machine is greatly improved;

(2) a plurality of noncontact electrodes for power supply with the same polarity and array-type measurement are installed on the shield to provide an observation mode available for electrical advanced detection for tunneling bad geologies; the electrode system is only installed on the cutter head, so that the interference of metal objects in back can be effectively avoided, the front advanced detection capability can be improved, and more importantly, the problem of extremely narrow space between the cutter head and the tunnel face is solved;

(3) the emission and measurement module put forward by the present invention has the functions of multi-frequency emission and multi-way acquisition and can sequentially modulate different frequencies for detecting to obtain rich data, meanwhile, the information of the measuring electrode system can be simultaneously acquired via the multi-way acquisition in the rotating pattern of the cutter head, so that the problems caused by position changes of the power supply electrodes are solved;

(4) according to the shield-along tunneling real-time detection method put forward by the present invention, detected data on different mileages is acquired in shield-along tunneling, so that the multiplicity in the inversion process can be well suppressed, the precision of three-dimensional inversion can be improved, and then the accuracy of advanced detection in the complex tunneling environment is improved.

In which: 1—noncontact electrode, 2—cutter head, 3—earth inside earth pressure balance shield earth chamber, 4—structure outside earth pressure balance shield earth chamber, 5—electrode positioning device, 6—swivel joint, 7—multi-core cable, 8—fixed electrode, 9—wear-resistant insulating material, 10—metal oxide film, 11—compact rubber plug, 12—cable winding fixing column, 13—metal copper plate, 14—metal fixed hoop, 15—rotor side cable conduction port, 16—swivel joint housing, 17—rotor lead, 18—rotor fixer, 19—stator lead, 20—swivel joint fixing nut, 21—stator side cable conduction port, 22—jacket, 23—braided layer, 24—insulating layer, 25—copper wire, 26—light emitting device, 27—secondary grating, 28—photosensitive device, 29—rotating shaft, 30—grating type euphotic coded disc, 31—euphotic grating, 32—host system, 33—control module, 34—multi-frequency power supply output device, 35—multi-way acquisition and reception device, 36—inversion interpretation module, 37—display terminal, 38—power driving module, 39—sinusoidal oscillator, 40—circuit amplifier, 41—voltage and current measuring module, 42—overvoltage and overcurrent protection module, 43—first data acquisition module, 44—digital display module, 45—data storage module, 46—data communication module, 47—singlechip, 48—input protection module, 49—ground compensation, power frequency signal suppression and noise processing module, 50—differential input amplifier module, 51—data sampling module, 52—primary 50 Hz wave trap, 53—secondary 100 Hz wave trap, 54—ternary 150 Hz wave trap, 55—A/D converter, 56—second data acquisition module.

DETAILED DESCRIPTION OF THE EMBODIMENTS

The present invention will be further described below in combination with the accompanying drawings and embodiments.

Figure 1:
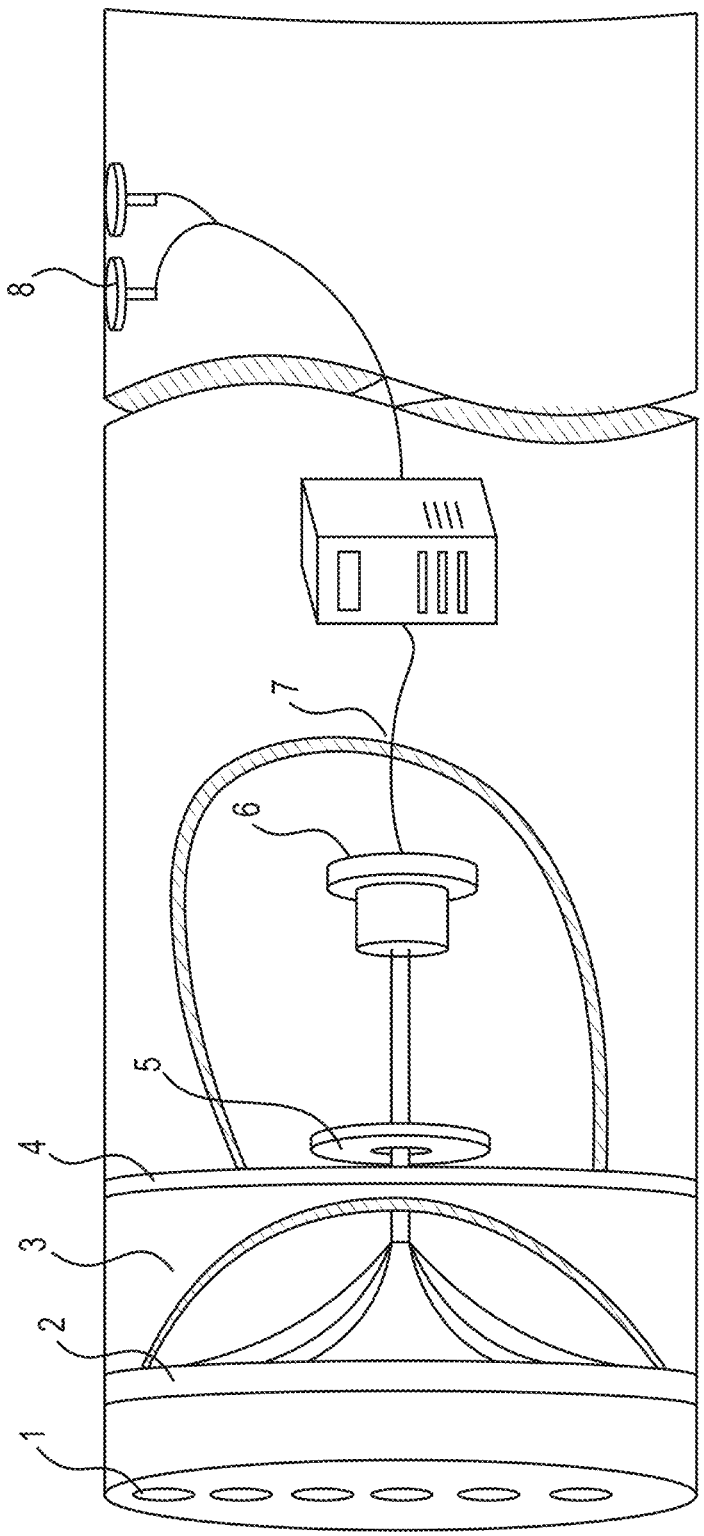
FIG. 1 is a schematic diagram of an overall structure of a detection system in an embodiment of the present invention.

As shown in FIG. 1, a noncontact frequency-domain electrical real-time advanced detection system includes noncontact electrodes 1, an electrode positioning device 5, a power supply and measurement device and a host system 32; the noncontact electrodes 1 are arranged on a front panel of a cutter head, and each noncontact electrode 1 is converged to a multi-core cable 7 via a swivel joint by a single-core cable and then connected to the power supply and measurement device.

The swivel joint 6 is installed in the middle of the cutter head, the electrode positioning device 5 is only installed in the middle of the cutter head and is hollow, and the single-core cables for connecting the electrodes can penetrate through the electrode positioning device 5. The electrode positioning device 5 is only electrically connected with the host system 32.

The electrode positioning device 5 is installed in the center of a rear panel of the cutter head, and then the swivel joint is installed in back of the electrode positioning device 5. The host system 32 is electrically connected to the electrode positioning device 5 and the power supply and measurement device, and the power supply and measurement device is further electrically connected with fixed electrodes 8.

The power supply and measurement device realizes emission of multi-frequency current and acquisition of measurement signals under the control of the host system 32, and acquires potential differences between the noncontact electrodes 1 and the fixed electrodes 8; the electrode positioning device 5 transmits spatial position information of the noncontact electrodes 1 to the host system 32 in real time, the power supply and measurement device transmits measurement signals to the host system 32 in real time, the host system 32 carries inversion software for processing and interpreting data.

The power supply and measurement device can be arranged in the host system 32.

The host 32 operates a multi-frequency power supply output device 34 via a display terminal 37 and a control module 33, a singlechip 47 arranged in the multi-frequency power supply output device 34 stores waveforms, is set by the host 32, then receives input current via a power driving module 38 and sends out signals of corresponding frequencies via a sinusoidal oscillator 39, the signals are connected to electrodes A and B to supply power, the output current is detected by a voltage and current measuring module 41 while being output, and the detection result is fed back to the host 32 by a first data acquisition module 43 and displayed on the display terminal 37.

The signals output by the power supply electrodes A and B are received by measuring electrodes M and N on a contact face via the capacitance coupling effect and processed by a ground compensation, power frequency signal suppression and noise processing module 49, the multi-way signals are branched in a differential amplifier module 50, the interference of unavailable signals is further removed from sampled data by multistage wave traps specifically including a primary 50 Hz wave trap 52, a secondary 100 Hz wave trap 53 and a ternary 150 Hz wave trap 54, and voltage and current signals are converted into digital signals by an A/D converter 55 after being filtered and rectified and then entered to the host system 32 by a second data acquisition module 56 to display.

The noncontact electrodes 1 include four noncontact power supply electrodes and eight noncontact measuring electrodes, and the fixed electrodes 8 include one fixed power supply electrode and one fixed measuring electrode; the power supply and measurement device emits alternating current to supply power to the noncontact power supply electrodes and the fixed power supply electrode, and the potential differences are the ones between the noncontact measuring electrodes and the fixed measuring electrode.

Figure 2:
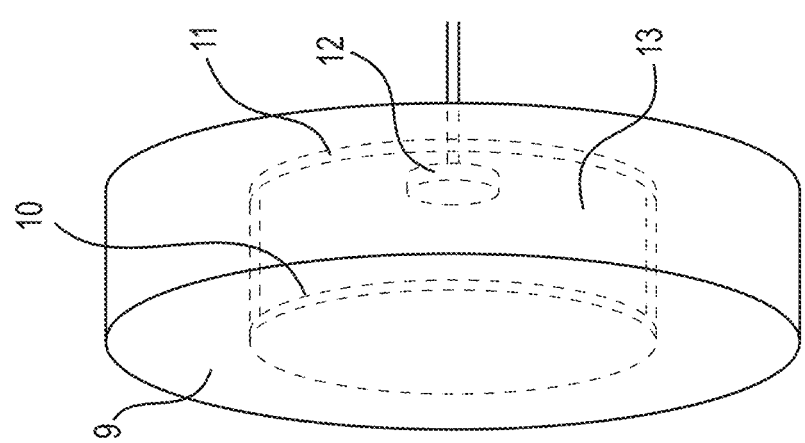
FIG. 2 is a structural schematic diagram of a noncontact electrode in an embodiment of the present invention.

The structure of each noncontact electrode 1 is shown in FIG. 2 and includes a metal copper plate 13, the metal copper plate 13 is a circular electrode plate, the surface of the metal copper plate 13 is wrapped by a metal oxide film 10 to prevent the performance from being influenced by corrosion due to long-time work after the electrode is installed. An insulating wear resistant material 9 forms the frame housing of the noncontact electrode 1, the metal copper plate 13 is wrapped in the insulating wear resistant material 9, meanwhile, the noncontact electrode 1 is embedded and fixed onto the surface of the cutter head 2 by the insulating wear resistant material 9, but the metal copper plate 13 does not directly contact the cutter head 2, the back of the metal copper plate 13 is connected with a single-core cable by a cable winding fixing column 12, the circumference of the cable winding fixing column 12 is buffered and fixed by a compact rubber plug 11, and the compact rubber plug 11 simultaneously isolates the metal copper plate 13 from the cutter head 2. Meanwhile, in order to exert the advantages of a focusing frequency-domain electrical method, the four noncontact power supply electrodes are arranged on the major radius of the cutter head 2 to output multi-way frequency-domain current, and the noncontact measuring electrodes are arranged on the small radius of the cutter head 2 to realize array measuring electrode acquisition, thereby improving the detection depth, suppressing interference and also providing data for three-dimensional inversion imaging.

In order to realize real-time transmission of current and measured signals under the condition that the noncontact electrodes 1 on the cutter head 2 rotate but the host system 32 in back does not rotate, the swivel joint 6 is arranged between the electrode positioning device 5 and the host system 32, the swivel joint 6 is composed of a rotor and a stator, the rotor side of the swivel joint 6 is connected with the noncontact electrodes 1, and the stator side of the swivel joint 6 is connected with the host system 32.

Figure 3:
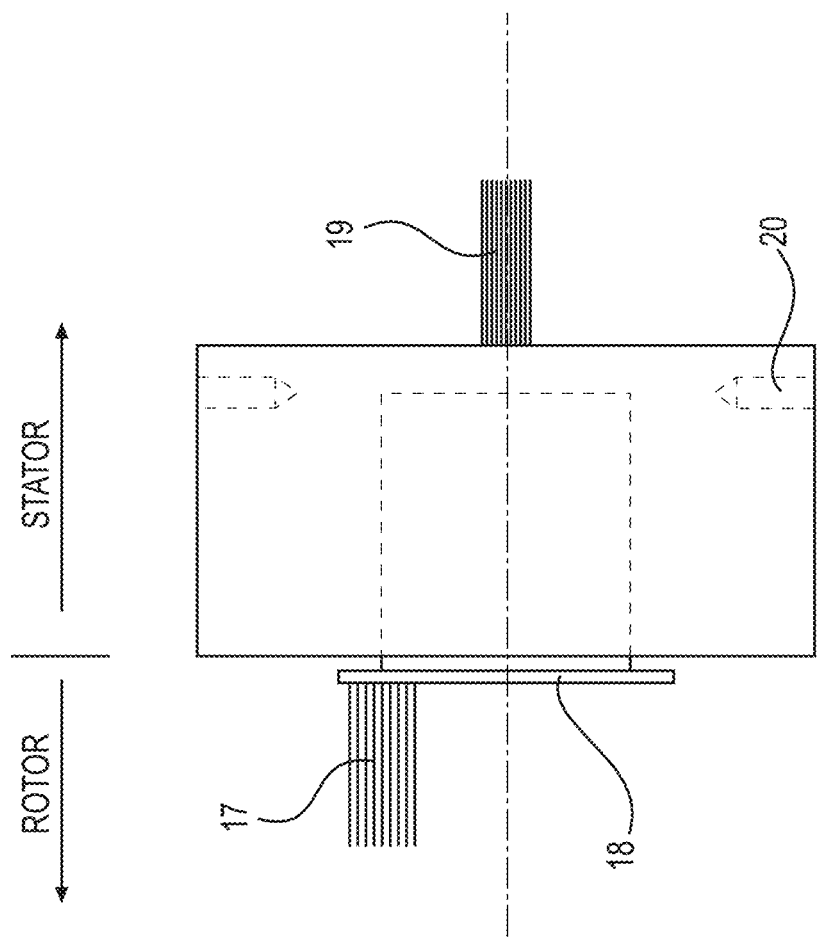
FIG. 3 is a structural schematic diagram of a swivel joint in an embodiment of the present invention.
Figure 4:
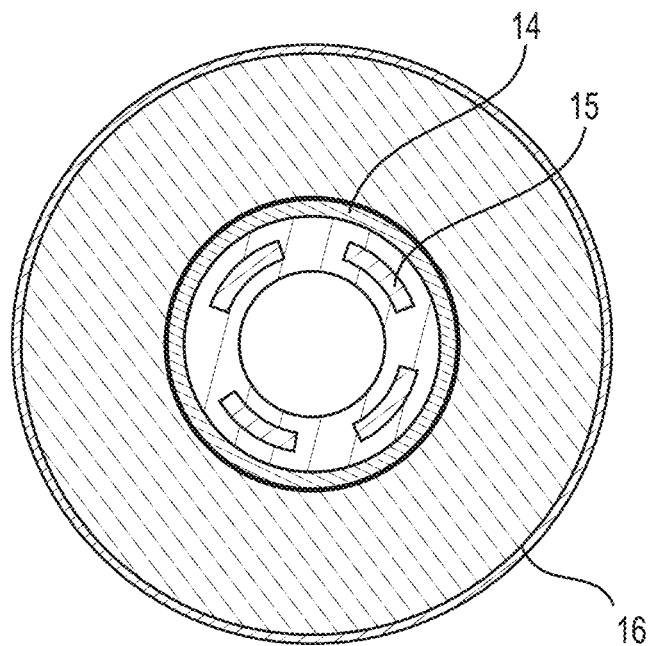
FIG. 4 is a structural schematic diagram of a rotor side of the swivel joint in FIG. 3.
Figure 5:
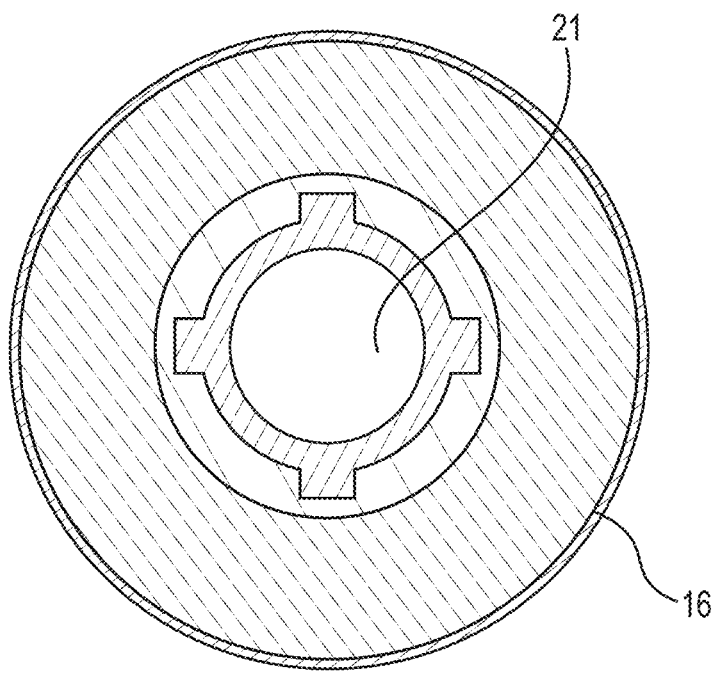
FIG. 5 is a structural schematic diagram of a stator side of the swivel joint in FIG. 3.

The structure of the swivel joint 6 is as shown in FIG. 3, FIG. 4 and FIG. 5. Swivel joint fixing nuts 20 are arranged on a swivel joint housing 16; a metal fixed hoop 14, rotor side cable conduction ports 15 and a rotor fixer 18 are arranged on the rotor side of the swivel joint 6, and rotor leads 17 are arranged in the rotor side cable conduction ports 15; a stator side cable conduction port 21 is formed in the stator side of the swivel joint 6, and a stator lead 19 is arranged in the stator side cable conduction port 21. The rotating end of the swivel joint 6 is connected with the noncontact electrodes installed on the cutter head to realize real-time transmission of current and measured signals under the condition that the noncontact electrodes on the cutter head rotate but the host in back does not rotate, and the noncontact electrodes do not need to contact surrounding rock of a tunnel face so that the transmission of frequency-domain current and measuring signals is realized. The multi-way swivel joint 6 is an electrical component for connecting the single-core cables in the rotating cutter head with the multi-core cable behind a shield. The swivel joint is installed in the center of a rotating shaft of the cutter head, and is mainly composed of a rotating portion and a static portion. The rotating portion is connected with multiple single-core cables in the cutter head, and the static portion is connected with the multi-core cable behind the shield. The single-core cables respectively correspond to the multi-core cable one by one inside the swivel joint via slip rings, and the single-core cables of the noncontact electrodes installed on the cutter head are converged herein and connected to the multi-core cable via the swivel joint to enter the host system 32.

Figure 6:
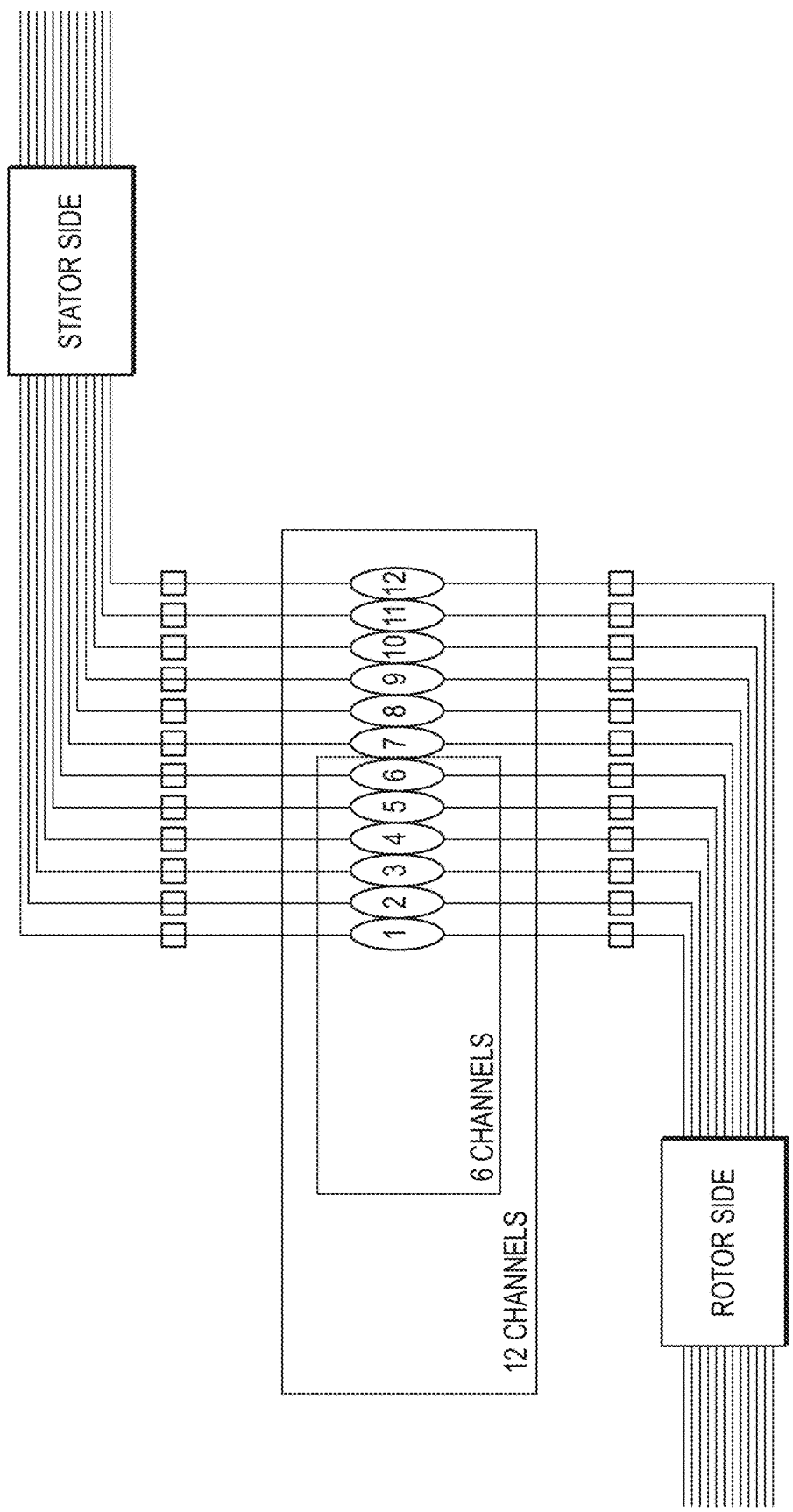
FIG. 6 is a multi-line connection circuit diagram of the swivel joint in an embodiment of the present invention.
Figure 7:
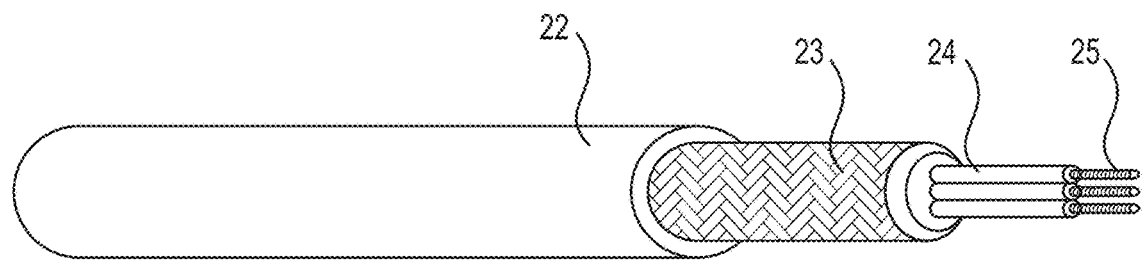
FIG. 7 is a structural schematic diagram of a multi-core cable in an embodiment of the present invention.

The connection circuit diagram of multiple lines inside the swivel joint 6 is as shown in FIG. 6, the noncontact electrodes 1 are connected with the swivel joint 6 via single-core cables, and the swivel joint 6 is connected with the host system 32 via the multi-core cable 7; the single-core cables respectively correspond to the multi-core cable one by one inside the swivel joint 6 via slip rings, and the single-core cables of the noncontact electrodes 1 installed on the cutter head 2 are converged herein and connected to the multi-core cable 7 via the swivel joint 6 to enter the host system 32. The structure of the multi-core cable 7 is as shown in FIG. 7, copper wires 25 are arranged in the center of the multi-core cable 7, and the copper wires 25 are sequentially wrapped by an insulating layer 24, a braided layer 23 and a jacket 22. Because the laying distance of the multi-core cable 7 inside the shield is long and the project environment of installation and fixation is also very complex, the multi-core cable jacket 22, the braided layer 23 and the insulating layer 24 better protect the multi-core cable 7 from being easily worn in the cutter head 2, and relieve the interference of a shield tunneling machine to the alternating current in the copper wires to a certain degree.

Figure 8:
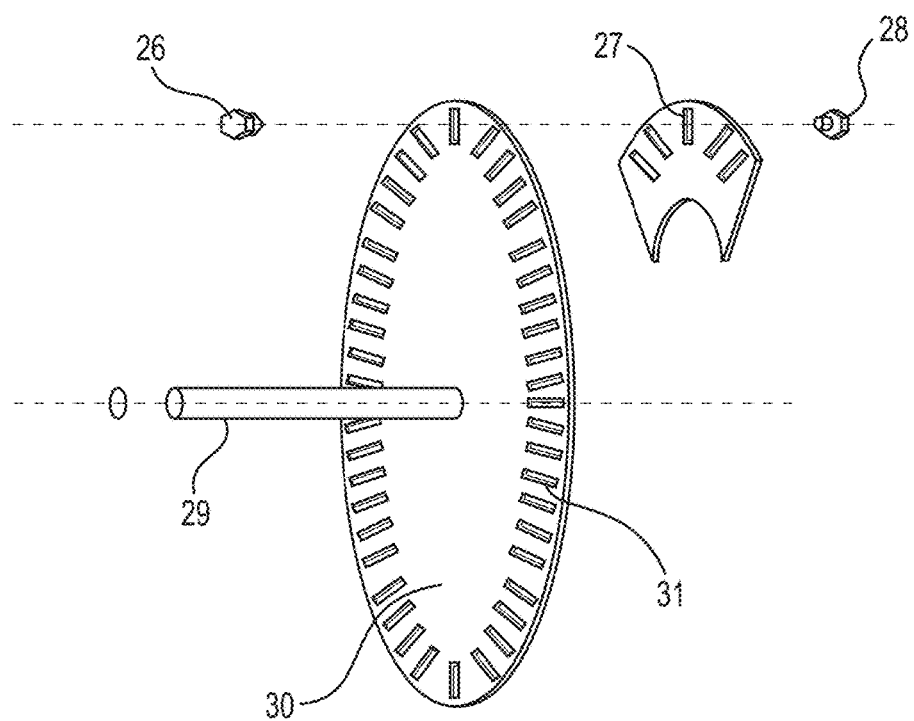
FIG. 8 is a structural schematic diagram of an electrode positioning device in an embodiment of the present invention.

The structure of the electrode positioning device is as shown in FIG. 8, the electrode positioning device 5 is a rotary coder including a grating type euphotic coded disc 30, a rotating shaft 29 is arranged in the center of the grating type euphotic coded disc 30 and is hollow or reserved with a hole, so that the single-core cables of the noncontact electrodes 1 penetrate through the electrode positioning device 5 but do not produce electrical connection and mechanical connection with the electrode positioning device 5.

Euphotic gratings 31 are uniformly distributed at the edge of the grating type euphotic coded disc 30, a light emitting device 26 is arranged on one side of the grating type euphotic coded disc 30, the light emitting device 26 and the noncontact electrodes 1 rotate with the cutter head 2 of the shield tunneling machine, and secondary gratings 27 and a photosensitive device 28 are arranged on the other side of the grating type euphotic coded disc 30.

The light emitting device 26 is arranged on the back of the cutter head 2, and rotates along with the cutter head 2. Light emitted by the light emitting device 26 penetrates through the gratings and is received by the photosensitive device 28 and transmitted to the rotary coder, and the rotary coder determines the positions of the noncontact electrodes via angular displacement and angular speed of a photoelectric conversion output shaft, thereby recording the rotating displacement of the cutter head 2 and then positioning the electrodes on the cutter head.

The electrode positioning device is installed on an extension line in the middle of the cutter head 2, and the single-core cables of the noncontact electrodes 1 penetrate through the middle of the electrode positioning device and then are connected to the swivel joint.

Figure 9:
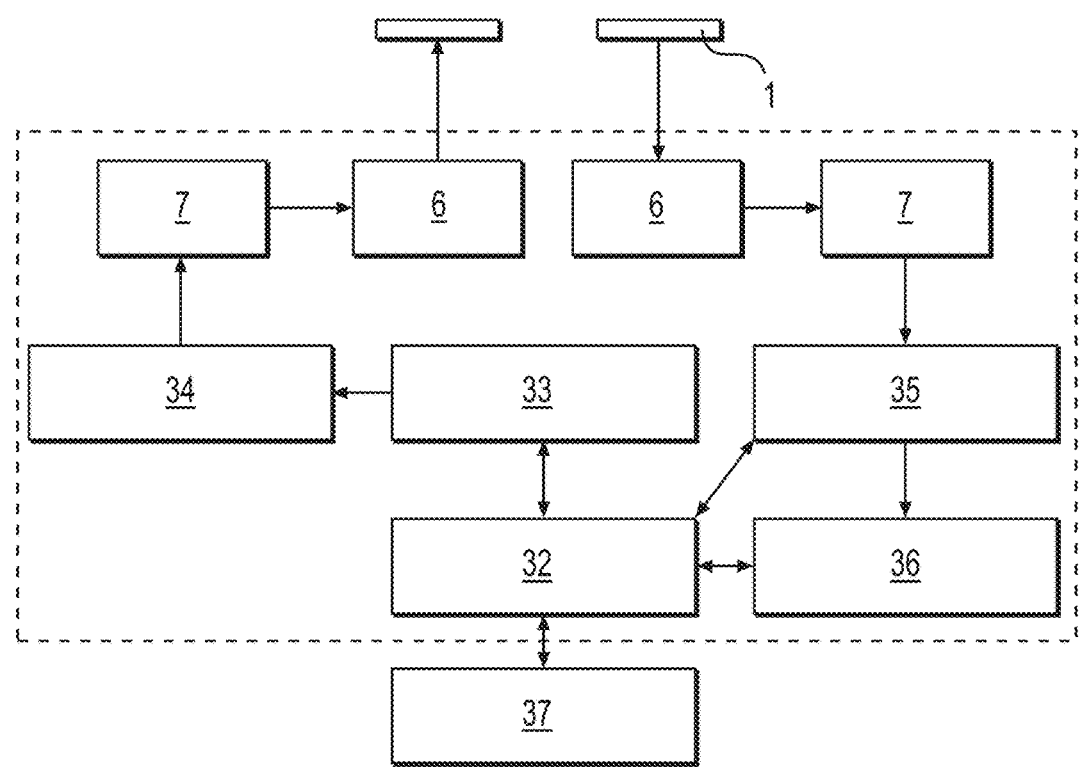
FIG. 9 is a schematic diagram of the structural principle of a host system in an embodiment of the present invention.

The structural principle of the host system 32 is as shown in FIG. 9. The host system 32 includes a control module 33, a first data acquisition module 43, an inversion interpretation module 36 and a display terminal 37, wherein the control module 33 controls the sampling time of the power supply and measurement system and sets the sampling rate, the first data acquisition module 43 acquires data of the noncontact electrodes 1 and the electrode positioning device 5 and transmits the acquired data to the inversion interpretation module 36, and inversion software for inversing the acquired data is set in the inversion interpretation module 36; setting of the control module 33, presentation of the data acquired by the data acquisition module and data inversion of the inversion interpretation module 36 are all displayed via the display terminal 37.

The power supply and measurement system includes a multi-frequency power supply output device 34 and a multi-way acquisition and reception device 35.

Figure 11:
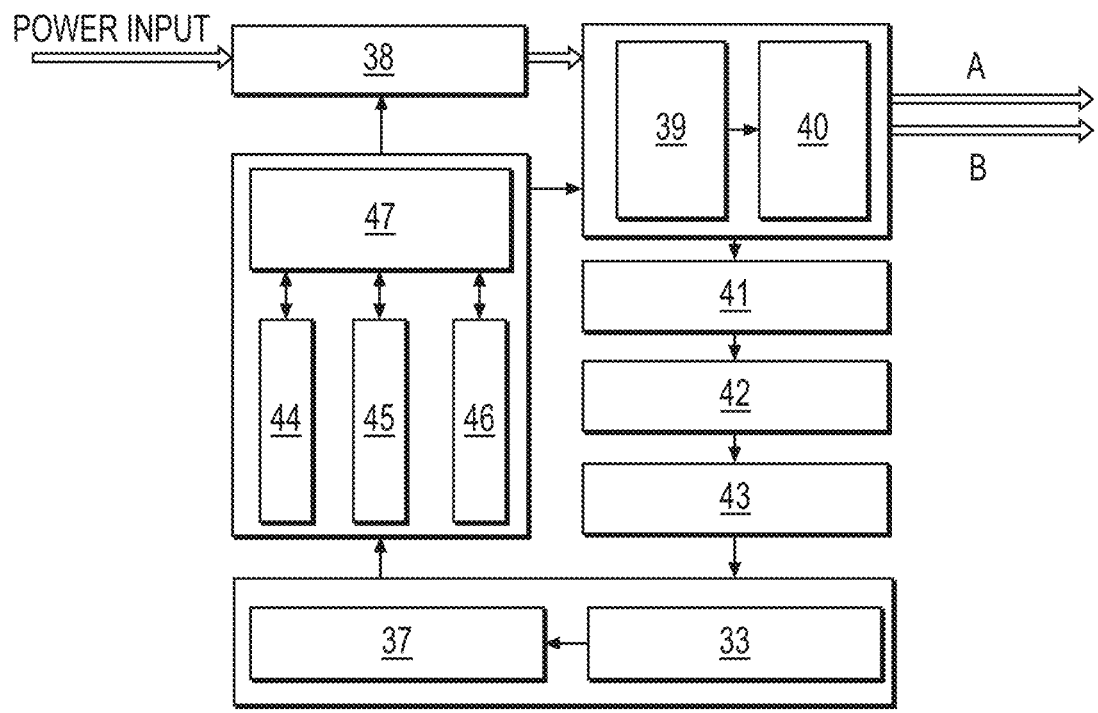
FIG. 11 is a schematic diagram of the structural principle of a multi-frequency power supply output device in an embodiment of the present invention.

The structural principle of the multi-frequency power supply output device 34 is as shown in FIG. 11, the multi-frequency power supply output device 34 mainly includes a sinusoidal oscillator 39 and a singlechip 47, power is connected to the multi-frequency power supply output device 34 via a power driving module 38, a circuit amplifier 40 is connected to the sinusoidal oscillator 39, a chip of the singlechip 47 stores program codes of output waveforms via a data storage module 45, and under the control of the control module 33, the sinusoidal oscillator 39 supplies alternating current to the detection system so as to realize multi-frequency current output.

The alternating current provided by the sinusoidal oscillator 39 arrives at the first data acquisition module 43 via a voltage and current measuring module 41, and an overvoltage and overcurrent protection module 42 is arranged between the voltage and current measuring module 41 and the first data acquisition module 43; and the singlechip 47 is provided with a digital display module 44, a data storage module 45 and a data communication module 46.

Figure 12:
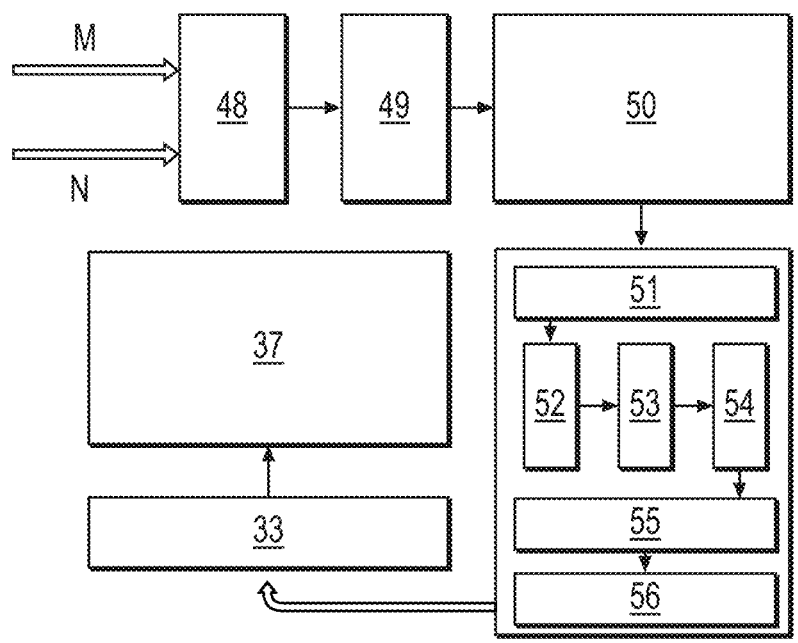
FIG. 12 is a schematic diagram of the structural principle of a multi-way acquisition and reception device in an embodiment of the present invention.

The structural principle of the multi-way acquisition and reception device 35 is as shown in FIG. 12. The multi-way acquisition and reception device 35 includes wave traps, a rectifier filter and an A/D converter 55, wherein the wave traps are filters for removing some unavailable signals to reduce the interference to available signals, the current output by the multi-frequency power supply output device 34 is filtered by the wave traps and then arrives at the rectifier filter, the rectifier filter converts the alternating current into direct current and further removes interference, the A/D converter 55 converts voltage and current signals into digital signals and the digital signals are transmitted to the host system 32, so that synchronous acquisition of multi-way signals is realized.

The multi-way acquisition and reception device 35 is further provided with an input protection module 48, a ground compensation, power frequency signal suppression and noise processing module 49, a differential input amplifier module 50 and a data sampling module 51; current passes through the protection module 48, the ground compensation, power frequency signal suppression and noise processing module 49, the differential input amplifier module 50 and the data sampling module 51 and then enters the wave traps; and the wave traps include a primary 50 Hz wave trap 52, a secondary 100 Hz wave trap 53 and a ternary 150 Hz wave trap 54.

A shield tunneling machine of this embodiment includes the aforementioned noncontact frequency-domain electrical real-time advanced detection system, as shown in FIG. 1, the noncontact electrodes 1 are installed on the working face of the cutter head 2 of the shield tunneling machine and rotate along with the cutter head 2, and the fixed electrodes 8 are fixedly arranged at the tail of the shield tunneling machine. The shield tunneling machine includes earth inside an earth pressure balance shield earth chamber 3 and a structure outside the earth pressure balance shield earth chamber.

Figure 10:
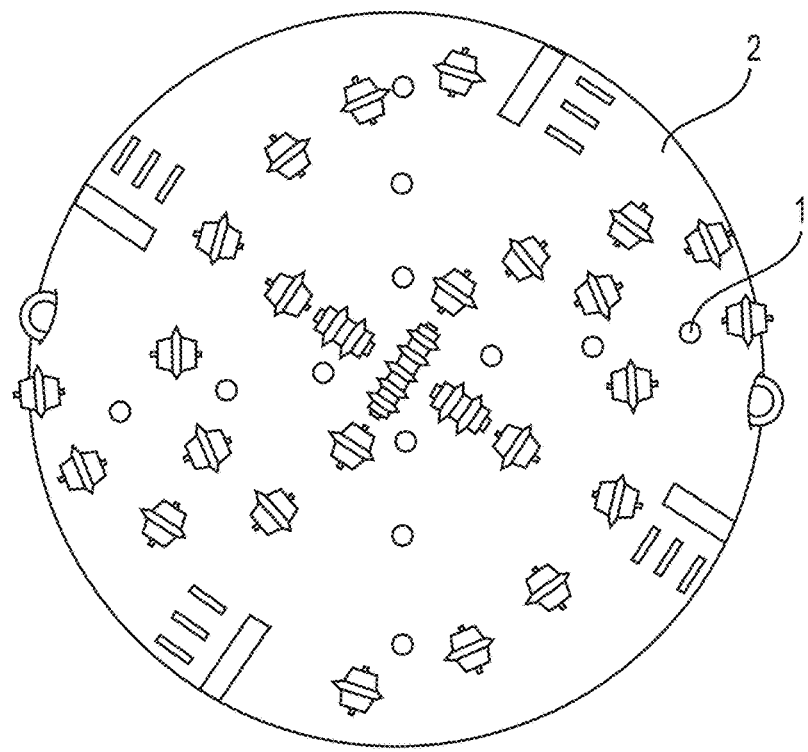
FIG. 10 is an arrangement diagram of noncontact electrodes on a cutter head in an embodiment of the present invention.

The arrangement of the noncontact electrodes 1 on the cutter head 2 is as shown in FIG. 10, the noncontact electrodes 1 include four power supply electrodes and eight measuring electrodes, and the power supply electrodes are installed on the major radius of the cutter head 2 to form a plurality of noncontact power supply electrodes with the same polarity; and the measuring electrodes are installed on the small radius of the cutter head 2 to form an array-type noncontact measuring electrode system.

A detection method of this embodiment includes the following steps:

Step (1): four noncontact power supply electrodes and eight noncontact measuring electrodes are installed on a cutter head in the manufacturing process of a shield tunneling machine, as shown in FIG. 10, the noncontact power supply electrodes and the noncontact measuring electrodes are respectively annularly distributed on the working face of the cutter head 2, a ring constituted by the noncontact power supply electrodes is sleeved outside a ring constituted by the noncontact measuring electrodes (that is, the noncontact power supply electrodes are installed on the major radius of the cutter head 2, and the noncontact measuring electrodes are installed on the small radius of the cutter head 2), the polarities of the plurality of noncontact power supply electrodes are the same, and the plurality of noncontact measuring electrodes constitute an array-type noncontact measuring electrode system; meanwhile, one fixed power supply electrode and one fixed measuring electrode are fixedly installed at infinite positions behind a shield.

Step (2): a swivel joint 6 and an electrode positioning device 5 are installed on the shield tunneling machine, a multi-core cable 7 and single-core cables are laid in the shield tunneling machine, one end of each single-core cable is connected to a noncontact electrode on the cutter head 2, and the other end of each single-core cable penetrates through the hollow portion of the electrode positioning device 5 and is connected to the swivel joint 6; the multi-core cable 7 is connected between the swivel joint 6 and a power supply and measurement device, meanwhile, the fixed power supply electrode and the fixed measuring electrode are respectively connected to the power supply and measurement device by the single-core cables, a host system 32 is connected with the electrode positioning device 5 and the power supply and measurement device, and the connection of a noncontact frequency-domain electrical real-time advanced detection system is thus accomplished.

Step (3): alternating current with fixed frequency is set by the host system 32 and supplied to the noncontact power supply electrodes on the working face and the faraway fixed power supply electrode, the alternating current is supplied to surrounding rock of a tunnel face via the capacitance coupling effect of the noncontact power supply electrodes, the surrounding rock generates electric potential so that the noncontact measuring electrodes in the array-type noncontact measuring electrode system generate current, the electric potentials of the noncontact measuring electrodes are measured after the current passes through a rectifier filter and an A/D converter, the potential difference between each noncontact measuring electrode and the fixed measuring electrode is obtained, meanwhile, the electrode positioning device 5 transmits spatial position information of each noncontact electrode 1 to the host system 32, and correspondence between measured data and position data is thus accomplished.

Step (4): the fixed frequency domain set by the host system 32 is changed sequentially, and step (3) is repeated to obtain data under different frequencies.

Step (5): next working face is sequentially selected for detection with the propulsion of the cutter head 2 of the shield tunneling machine on the tunnel face, and step (3) and step (4) are repeated to realize real-time acquisition of detected data.

Step (6): the host system 32 iterates the acquired data, inverses potential difference data measured by the array-type noncontact measuring electrode system to obtain three-dimensional resistance image distribution in front of the working face, and then interprets the geological condition in front of the tunnel face.

The noncontact electrodes 1 are arranged on the cutter head 2 of an earth pressure balance shield, and the host system is arranged in a master control chamber of the earth pressure balance shield. The multi-frequency power supply output device 34, the multi-way acquisition and reception device 35 and the multi-core cable 7 are arranged behind the cutter head of a shield main body; the noncontact electrodes 1 and the single-core cables 7 are arranged on the surface of and inside the cutter head and connected by the swivel joint; and the fixed power supply electrode B and the fixed measuring electrode N8 are fixedly arranged at the tail of the shield. Main operations of the whole noncontact electrical real-time detection process are all accomplished in the master control chamber of the shield. The overall structure of the noncontact electrical real-time detection system carried by the shield tunneling machine is as shown in FIG. 1.

During detection, the noncontact electrodes 1 are firstly positioned via signals acquired by the electrode positioning device, the host system in the master control chamber of the earth pressure balance shield sets detection requirements, sampling frequency, sampling rate and the like and gives instructions, and the control module 33 controls the multi-frequency power supply output device 34 to start to work and output alternating current with the frequency and value set by the host system. The output alternating current is transmitted via the multi-core cable 7, transferred at the swivel joint 6 behind the cutter head of the shield host and branched into multiple paths of alternating current, and each path of alternating current is transmitted to a metal copper plate 13 inside the noncontact electrode 1 on the cutter head 2 via the corresponding single-core cable 7. Interference between the metal copper plates 13 in the noncontact electrodes 1 and the cutter head 2 metal is isolated via a wear-resistant insulating material 9, a metal oxide film 10 and a compact rubber plug 11, thereby effectively ensuring conduction of the alternating current and stability of the metal copper plates 13.

The metal copper plates 13 are isolated from the tunnel face via the insulating material, the tunnel face is regarded as the other electrode plate of a capacitor, then after the alternating current is connected to the power supply electrodes, the tunnel face and the metal copper plates 13 produce a capacitance coupling effect under the action of the alternating current, the power supply electrodes interact with the tunnel face via the alternating current, the tunnel face 1 serves as the other electrode of the capacitor so that the tunnel face 1 and the measuring electrodes also produce the capacitance coupling effect to generate alternating current, the measuring electrodes receive the generated alternating current, the alternating current passes through the multi-core cable 7 and is converged at the swivel joint 6 and transmitted to the multi-way acquisition and reception device 35 by the multi-core cable 7, the alternating current is converted into direct current by A/D conversion and filtering, and a power supply measurement operation is thus accomplished.

The arrangement diagram of the noncontact electrodes 1 on the cutter head as measuring/power supply electrodes is as shown in FIG. 9, both the power supply electrodes and the measuring electrodes are installed on the cutter head, the power supply electrodes are installed on the major radius, and the measuring electrodes are installed on the small radius. The noncontact electrodes 1 are installed on the cutter head 2 in an embedded mode by adopting the insulating wear resistant material.

After the host system accomplishes measurement according to the predetermined detection plan, the multi-way acquisition and reception device 35 acquires measurement result each time and outputs a measured data file, the measured data file is transmitted to the inversion interpretation module 36 to process data, and the obtained processing result is output to the host 32 and presented by the display terminal 37.

Further, the inversion software, wave traps, timing software, singlechip and the like mentioned in the present invention belong to the prior art, and are not redundantly described herein. Fine adjustments may be made to part of appliances by those skilled in the art according to the specific construction condition and the field situation, and these adjustments also should fall into the protection scope of the present invention. The specific embodiments of the present invention are described above in combination with the accompanying drawings, but do not limit the protection scope of the present invention. It should be appreciated by those skilled in the art that various modifications or variations made by those skilled in the art without any creative effort based on the technical solutions of the present invention shall fall into the protection scope of the present invention.

The invention claimed is:

1. A shield-carried noncontact frequency-domain electrical real-time advanced detection system, comprising a noncontact electrode unit, a multi-way swivel joint, an electrode positioning unit, a power supply and measurement unit and a control unit, wherein the noncontact electrode unit comprises a plurality of noncontact electrodes arranged on a front panel of a cutter head and is used for array-type multi-way information acquisition, the electrode positioning unit is arranged in a middle portion of a rear panel of the cutter head and used for determining rotating positions of the noncontact electrodes for real-time positioning;

the multi-way swivel joint is arranged behind the cutter head, a connection cable for each noncontact electrode is converged to a multi-core cable, the power supply and measurement unit outputs multi-way frequency-domain current and acquires signals, and the control unit is connected with the power supply and measurement unit and used for acquiring data of the noncontact electrodes and positions of the electrodes on the cutter head according to different set frequency domains and then performing three-dimensional inversion and interpretation.

2. The shield-carried noncontact frequency-domain electrical real-time advanced detection system according to claim 1, wherein the power supply and measurement unit is further connected with fixed electrodes, and is used for emitting multi-frequency current and acquiring measured signals under the control of the control unit and acquiring potential differences between the noncontact electrodes and the fixed electrodes.

3. The shield-carried noncontact frequency-domain electrical real-time advanced detection system according to claim 1, wherein the noncontact electrodes comprise noncontact power supply electrodes and noncontact measuring electrodes, the noncontact power supply electrodes are arranged on the outer side of the cutter head and connected with the power supply and measurement unit to output multi-way frequency-domain current, and the noncontact measuring electrodes are arranged on the inner side of the power supply electrodes to realize arrayed measuring electrode acquisition.

4. The shield-carried noncontact frequency-domain electrical real-time advanced detection system according to claim 1, wherein each noncontact electrode comprises an electrode plate, the surface of the electrode plate is wrapped by a metal oxide film, the electrode plate is located in a frame housing formed by an insulating wear resistant material, a cable fixing column is arranged on the back of the electrode plate, and a rubber plug is arranged on the circumference of the cable fixing column.

5. The shield-carried noncontact frequency-domain electrical real-time advanced detection system according to claim 1, wherein the electrode positioning unit is a rotary coder comprising a grating type euphotic coded disc and a photoelectric processing circuit, and the photoelectric processing circuit determines the positions of the noncontact electrodes via angular displacement and angular speed of the grating type euphotic coded disc, so that the rotating displacement of the cutter head is realized, and then the noncontact electrodes on the cutter head are positioned.

6. The shield-carried noncontact frequency-domain electrical real-time advanced detection system according to claim 5, wherein a rotating shaft is arranged in the center of the grating type euphotic coded disc, euphotic gratings are uniformly distributed at the edge of the grating type euphotic coded disc, a light emitting device is arranged on one side of the grating type euphotic coded disc, the light emitting device and the noncontact electrodes rotate with the cutter head of the shield tunneling machine, and secondary gratings and a photosensitive device are arranged on the other side of the grating type euphotic coded disc; and light emitted by the light emitting device penetrates through the gratings of the grating type euphotic coded disc and the secondary gratings and is received by the photosensitive device.

7. The shield-carried noncontact frequency-domain electrical real-time advanced detection system according to claim 6, wherein the connection cables of all the noncontact electrodes are placed inside the rotating shaft.

8. The shield-carried noncontact frequency-domain electrical real-time advanced detection system according to claim 1, wherein the multi-core cable comprises multiple metal leads, each metal lead is wrapped by an insulating layer, all the metal leads are wrapped by a braided layer, and the braided layer is wrapped by a jacket.

9. The shield-carried noncontact frequency-domain electrical real-time advanced detection system according to claim 1, wherein the multi-way swivel joint comprises a rotor and a stator, the rotor is movably connected to the stator, a plurality of passages are distributed on the rotor along the central circumference, the connection cables of the noncontact electrodes are arranged in the passages, a cable passage for bearing the multi-core cable is formed in the center of the stator, and the connection cables respectively correspond to the metal leads of the multi-core cable one by one inside the stator via slip rings.

10. The shield-carried noncontact frequency-domain electrical real-time advanced detection system according to claim 1, wherein the power supply and measurement unit comprises a multi-frequency power supply output module, a multi-way acquisition and reception module and a control module, wherein the control module controls the operations of the multi-frequency power supply output module and the multi-way acquisition and reception module and is connected with a display module; the multi-frequency power supply output module comprises a sinusoidal oscillator and a singlechip, the singlechip controls the sinusoidal oscillator to output alternating current of corresponding waveforms, then electrical energy is provided to the power supply electrodes, and multi-frequency current is thus output; the sinusoidal oscillator is connected with a circuit amplifier; and the control module is further connected with a voltage and current measuring module, an overvoltage and overcurrent protection module and a data acquisition module.

11. The shield-carried noncontact frequency-domain electrical real-time advanced detection system according to claim 10, wherein the multi-way acquisition and reception module specifically comprises a data sampling module, an input protection module, wave traps, a rectifier filter and an A/D converter, wherein the input protection module is connected with the measuring electrodes of the fixed electrodes and the noncontact electrodes, the potential of each measuring electrode is measured via the data sampling module, the wave traps, the rectifier filter and the A/D converter in sequence, and the potential differences between the measuring electrodes of the noncontact electrodes and the fixed electrodes are obtained; and the A/D converter is connected with the control module.

12. The shield-carried noncontact frequency-domain electrical real-time advanced detection system according to claim 1, wherein the control unit comprises a control host and an inversion module, the control host is connected with the control module and the multi-way acquisition and reception module, receives the potential differences between the measuring electrodes of the noncontact electrodes and the fixed electrodes and simultaneously receives position information of the cutter head transmitted by the electrode positioning unit, and the control host sets the acquisition frequency domain; and the inversion module inverses the acquired data.

13. A noncontact electrical real-time advanced detection method for a shield construction tunnel comprises the following steps:
  (1) arranging a plurality of noncontact measuring electrodes and noncontact power supply electrodes on a surface of a cutter head of a shield tunneling machine, and arranging a power supply electrode and a measuring electrode of fixed electrodes behind the shield tunneling machine;
  (2) setting an electrode positioning device to determine a position of the cutter head and spatial positions of the noncontact measuring electrodes, and setting alternating current with fixed frequency by using a control host to supply power to each power supply electrode;
  (3) acquiring potentials of the noncontact measuring electrodes and the measuring electrode of the fixed electrodes at a set frequency domain, calculating a potential difference between the potentials, simultaneously determining spatial position information of each noncontact electrode, thereby accomplishing correspondence between measured data and position data;

(4) changing the set frequency domain, and repeating step (3) to obtain potentials and position data at different frequency domains;

(5) sequentially selecting different working faces for detection along with propulsion of the cutter head of the shield tunneling machine on a tunnel face, repeating step (3) and step (4), thereby realizing real-time acquisition of detected data; and (6) iterating the acquired potentials, inversing potential difference data measured by an array-type noncontact measuring electrode system to obtain three-dimensional resistance image distribution in front of a working face, and then interpreting geological condition in front of the tunnel face.

14. The noncontact electrical real-time advanced detection method for a shield construction tunnel according to claim 13, wherein in step (1), the specific method is as follows: noncontact power supply electrodes and noncontact measuring electrodes are installed on the cutter head in the manufacturing process of the shield tunneling machine, the noncontact power supply electrodes and the noncontact measuring electrodes are respectively annularly distributed on the working face of the cutter head, a ring constituted by the noncontact power supply electrodes is sleeved outside a ring constituted by the noncontact measuring electrodes, the polarities of the plurality of noncontact power supply electrodes are the same, and the plurality of noncontact measuring electrodes constitute the array-type noncontact measuring electrode system; meanwhile, the fixed power supply electrode and the fixed measuring electrode are fixedly installed at the tail of the shield tunneling machine.

15. The noncontact electrical real-time advanced detection method for a shield construction tunnel according to claim 13, wherein step (2) specifically comprises: an electrode positioning device is installed on the central line of the cutter head, the rotating portion of the electrode positioning device is arranged on the back of the cutter head, the static portion is arranged behind the cutter head, a swivel joint is installed behind the cutter head, a multi-core cable and single-core cables are laid, one end of each single-core cable is connected to a noncontact electrode on the cutter head, and the other end of each single-core cable penetrates through the hollow portion of the electrode positioning device and is connected to the swivel joint.

16. The noncontact electrical real-time advanced detection method for a shield construction tunnel according to claim 13, wherein in step (2), the multi-core cable is connected between the swivel joint and a power supply and measurement device, meanwhile, the fixed power supply electrode and the fixed measuring electrode are respectively connected to the power supply and measurement device by the single-core cables, a host system is connected with the electrode positioning device and the power supply and measurement device, and the connection of a noncontact frequency-domain electrical real-time advanced detection system is thus accomplished.

17. The noncontact electrical real-time advanced detection method for a shield construction tunnel according to claim 13, wherein step (3) is specifically as follows: alternating current is supplied to surrounding rock of a tunnel face via the capacitance coupling effect of the noncontact power supply electrodes, the surrounding rock generates electric potential so that the noncontact measuring electrodes in the array-type noncontact measuring electrode system generate current, the potential difference between each noncontact measuring electrode and the fixed measuring electrode is obtained, meanwhile, the electrode positioning device transmits spatial position information of each noncontact electrode to the control host, and correspondence between measured data and position data is thus accomplished.

* * * * *